United States Patent [19]

Ju et al.

[11] Patent Number: 5,549,417
[45] Date of Patent: Aug. 27, 1996

[54] SUBSEA PIPELINE SHROUD

[75] Inventors: Gwo-Tarng Ju; Eric S. Goudy; Ray R. Ayers, all of Houston, Tex.

[73] Assignee: Shell Oil Company, Houston, Tex.

[21] Appl. No.: 155,394

[22] Filed: Nov. 19, 1993

[51] Int. Cl.$^6$ .............................. E02D 5/60; E02D 31/00
[52] U.S. Cl. .......................... 405/211; 138/103; 405/169; 405/170
[58] Field of Search ..................... 405/172, 211, 405/157, 154, 158; 138/177, 178, 103, 110

[56] References Cited

U.S. PATENT DOCUMENTS

| | | | |
|---|---|---|---|
| 3,248,886 | 5/1966 | Blenkarn | 405/211 |
| 3,518,835 | 7/1970 | Perry | 405/211 |
| 3,884,173 | 5/1975 | Fabula | 114/235 F |
| 4,190,012 | 2/1980 | Rispin et al. | 114/243 |
| 4,398,487 | 8/1983 | Ortloff et al. | 114/243 |
| 4,470,722 | 9/1984 | Gregory | 405/195 |
| 4,474,129 | 10/1984 | Watkins et al. | 114/243 |
| 4,657,116 | 4/1987 | Gardner et al. | 187/1 R |
| 4,718,459 | 1/1988 | Adorjan | 405/172 |
| 5,193,937 | 3/1993 | Miller | 405/172 X |
| 5,214,244 | 5/1993 | Cummings et al. | 174/42 |

FOREIGN PATENT DOCUMENTS 1267094  10/1986  U.S.S.R. ................. 405/172

OTHER PUBLICATIONS

M. M. Zdravkovich, "Review and Classification of Various Aerodynamic and Hydrodynamic Means for Suppressing Vortex Shedding," *Journal of Wind Engineering and Industrial Aerodynamics*, 7 (1981) 145–189.

M. J. Every et al., "Vortex–Excited Vibrations of Cylinders and Cables and Their Suppression," *Ocean Engng.*, 9, No. 2, (1982) 135–157.

A. R. Packwood, "Performance of Segmented Swept and Unswept Cable Fairings at Low Reynolds Numbers," *Ocean Engng.* 17, No. 4, (1990).

*Primary Examiner*—Dennis L. Taylor
*Attorney, Agent, or Firm*—Del S. Christensen

[57] ABSTRACT

Vortex-induced vibrations of unsupported segments of subsea pipelines are reduced by providing a shroud that can be lowered onto the subsea pipeline wherein the shroud creates turbulence that interferes with vortex shedding and thereby reduces the amplitude of vibrations are reduced. The preferred shroud comprises a plurality of rods supported in vertical planes along the sides of the pipeline. Installation can be performed without the use of divers.

6 Claims, 2 Drawing Sheets

FIG. 3
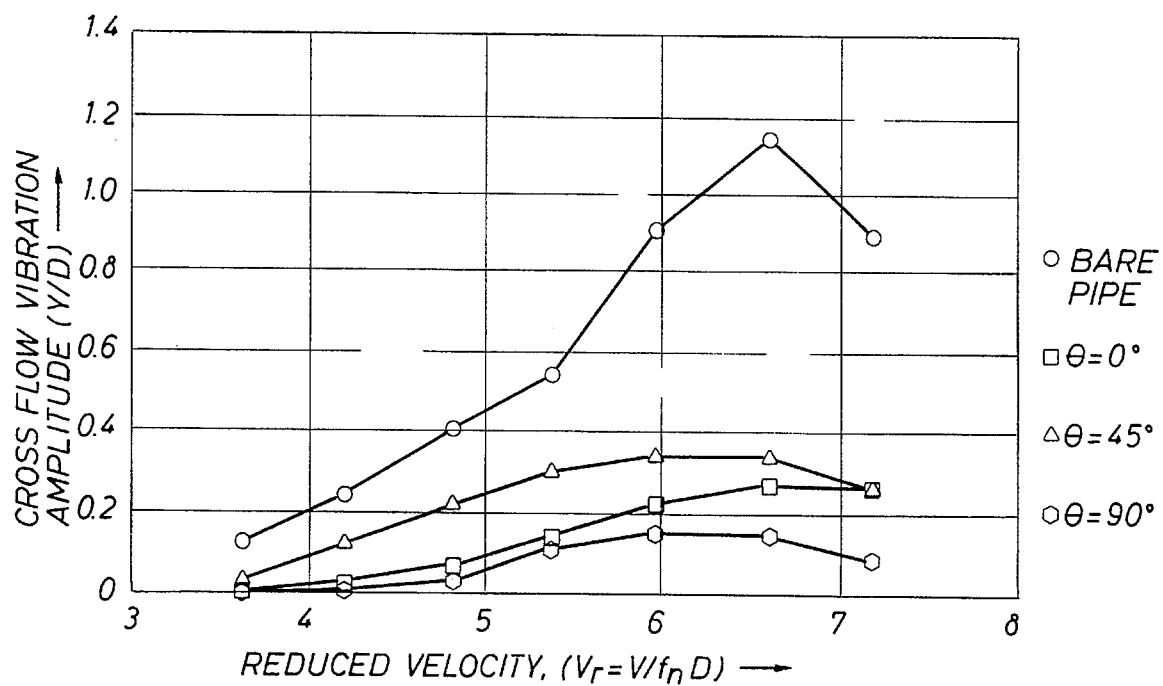
FIG. 4A
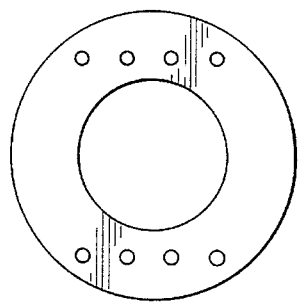
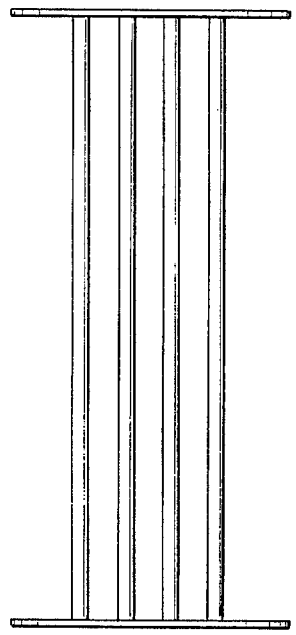
FIG. 4B 5,549,417

SUBSEA PIPELINE SHROUD

FIELD OF THE INVENTION

This invention relates to a subsea pipeline shroud and a method utilizing such a shroud to reduce vortex-induced vibrations of subsea pipelines.

BACKGROUND OF THE INVENTION

Unsupported segments of subsea pipelines are subject to vibrations caused by shedding of vortexes when currents have a significant velocity component perpendicular to the pipeline axis. When spans of pipeline are unsupported for lengths of a few hundred feet, currents of a 100-year storm could cause vibrations due to vortex shedding that could lead to failure of a pipeline within a short time period. This problem has been recognized and has typically been dealt with by supporting the segment of pipeline at one or more points along the suspension, by trenching out the high areas of the sea floor that cause the segment to remain off bottom, or by adding weight to the segment.

The segments are typically supported by dumping rocks over the suspension, or weighted down by placing concrete mats over the pipeline. If the sea floor is soft enough to allow jetting or trenching, the soil supporting the pipe may be removed to allow the pipeline to lay on the sea floor. When the unsupported segments are in shallow water and are suspended only short distances above the sea floor, these methods are relatively inexpensive and effective. However, as production of oil and gas is expanded into deep waters past the edge of the continental shelf, installation of pipelines over rougher sea floor terrain is becoming common. Larger gaps between the sea floor and the unsupported segments of pipeline are caused by this rougher sea floor terrain. Adding weight to or supporting a pipeline are caused by this rougher sea floor terrain. Adding weight to or supporting a pipeline can be very expensive when a large gap between the sea floor and pipeline exists. The large gaps also expose the pipeline to greater current velocities due to the diminished boundary effect of the sea floor. Also, the depths, which these spans occur in, are beyond the safe diving range; hence, any work done on the span must be performed with remotely operated underwater vehicles or other specially designed machinery that does not require diver assistance. Reduction of vortex-induced vibrations by weighting down, trenching out, or supporting the pipeline can be very expensive when the pipeline is beyond the continental shelf.

Vortex-induced vibrations have been of concern in the design of off-shore tension leg platform tendons and risers. When supporting such segments is not practical, fairings are used to eliminate vortex shedding. Fairings create a streamlined flowpath, resulting in elimination of the vortex-induced vibrations around the segment even with relatively high velocity currents. Fairings are relatively expensive, and are difficult to install without the aid of divers.

It is therefore an object of the present invention to provide a method to reduce vortex-induced vibrations in an unsupported segment of a subsea pipeline wherein the segment is not tied or supported, and wherein the method includes placing a shroud around at least a portion of the segment. It is a further object to provide such a method wherein the shroud can be placed around the segment without the aid of divers. In another aspect of the present invention, it is an object to provide a shroud useful in such a method.

SUMMARY OF THE INVENTION

These and other objects are accomplished by a method to reduce vortex induced vibrations of a segment of subsea pipeline, the segment being supported only at the ends of the segment, the method comprising the steps of: providing a shroud, the shroud comprising at least two parallel and essentially vertical sides, and a connecting member between the essentially vertical sides attached to the essentially vertical sides capable of supporting the shroud on the subsea pipeline, and the two essentially vertical sides capable of disturbing a fluid flowing normal to the axis of the parallel sides, the fluid-disturbing members effective to reduce the amplitude of vortex induced vibrations of the pipeline created by horizonal water currents perpendicular to the axis of the pipeline, when the shroud is supported on the subsea pipeline; and placing the shroud on the subsea pipeline.

The essentially vertical sides preferably comprise a plurality of rods, or cylindrical members, arranged horizontally in a common vertical plane, one essentially vertical side on each side of the pipeline. These rods preferably have outside diameters of between about 1/12th to about 1/8th of the outside diameter of the pipeline. Rods of this diameter can be connected by inverted U-shaped brackets to form a shroud that disturbs the flow and interferes with the process of vortex shedding. The disturbance reduces the amplitude of any vortex-induced vibrations, and the shroud can be set on the pipeline without the aid of divers. About four rods on each side of the pipeline are effective and are preferred to accomplish this reduction in amplitude.

The shroud preferably has a latch hingeably connected to a first end of the shroud wherein the latch can connect to the pipeline when the shroud is suspended vertically from above the segment. The shroud is then laid down onto the segment. A latching clamp could also be provided at the second end of the shroud. The length of the shroud is limited by the stiffness of the shroud in that the axial rods of the shroud should not buckle when it is laid down onto the suspended segment from a vertical position. A considerably longer segment of pipeline can be covered in one operation if a series of shrouds are connected by hinges end-to-end. The shrouds can then be laid down onto the pipeline sequentially with the subsequently laid-down shrouds remaining vertical.

BRIEF DESCRIPTION OF THE DRAWINGS

FIG. 3 is a plot of cross flow vibration amplitude as a function of reduced velocity for both bare pipe and a pipe having the shroud of the present invention with flow approaching the pipe perpendicularly from different angles from the horizon.

FIGS. 4A and 4B are front and side views of a shroud used to demonstrate the effectiveness of the shroud of the present invention.

DETAILED DESCRIPTION OF THE INVENTION

Figure 1:
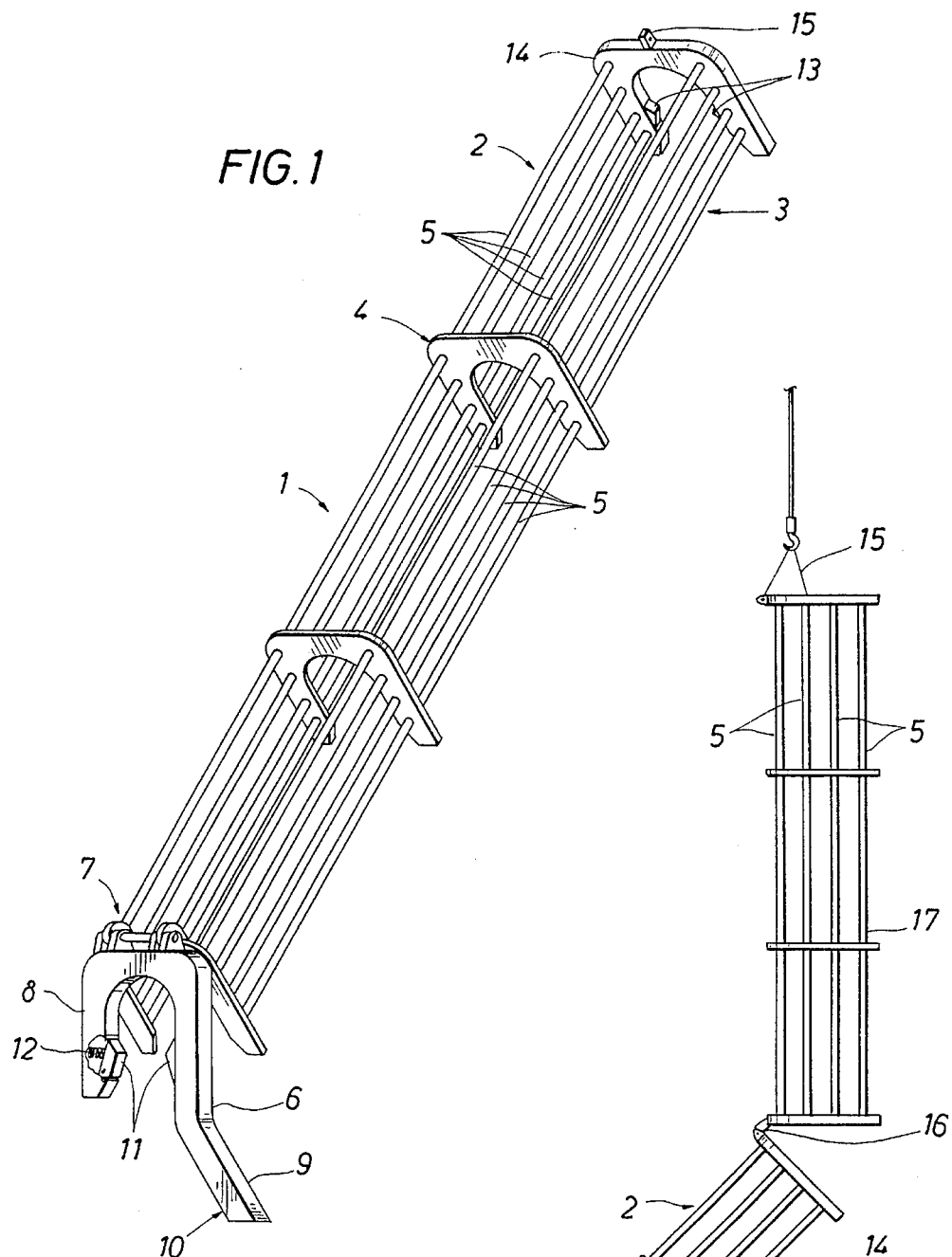
FIG. 1 is an isometric view of the shroud of the present invention.

Referring now to FIG. 1, a shroud, 1, of the present invention is shown. Parallel and essentially vertical sides, 2 and 3, are shown as sets of cylinders, or rods, 5. Four rods are shown on each side of the shroud. The sides are connected by four connecting members, 4, shown as inverted-U shaped braces. Distances between the braces are sufficiently short that the rods will not be subject to excessive vibration due to vortex shedding. The shape of the connecting members allows the shroud to be placed on a pipeline from above, and allows the shroud to rest on the pipeline. The outside diameter of the rods, 5, are sufficiently large to disrupt the creation of vortexes on the down-stream side of a pipeline on which the shroud is placed. The rods preferably have an outside diameter between about 1/12th and about 1/8th of that of the pipeline on which the shroud is to be placed. Smaller diameter rods may not create sufficient disturbance and larger diameter rods add excessively to the expense of the shroud. At least four rods on each side of the shroud are preferred, and four are most preferred. More rods add to the expense without significantly decreasing the amplitude of vibrations of a pipeline caused by vortex shedding.

A clamp, 6, is shown connected to a first end of the shroud by a hinge, 7. The clamp is hinged to hang down when the shroud is suspended vertically. The downward hanging clamp can catch a pipeline and align the shroud so that it can be easily placed on the pipeline without the aid of divers, and with minimal intervention by a remotely operated vehicle (not shown). The clamp shown is a horseshoe shaped clamp having two legs, 8 and 9, that can bracket the pipeline. One leg, 9, is extended by an extension, 10. The extension can aid in aligning the shroud along the axis of the pipeline without the use of divers. When the shroud is suspended above the pipeline within a distance less than the length of the extension, the shroud is moved laterally and the extension contacts the pipeline. The shroud continues to be pulled laterally, which applies a torque to the shroud causing it to pivot about the pipeline axis. Once the shroud is aligned with the pipe axis, the lateral force is halted. The shroud is then lowered and it will set down on top of the pipeline. This operation permits installation without divers.

The clamp may contain spring-loaded ears, 11, to lock the clamp onto a pipeline. Springs, 12, urge the ears toward the center of the clamp. The ears, 11, are hinged at the bottom so they pivot toward the center of the clamp when they are not forced outward. When the clamp is placed on a pipeline, the weight of the clamp causes the pipeline to force the ears away from the center of the clamp, allowing the clamp to settle on the pipeline. After the clamp has settled on the pipeline, the ears are again urged toward the center of the clamp. A upward force on the clamp will force the pipeline against the ears from the top of the ears. A force from the top of the ears will not move the ears away from the center of the clamp, and the clamp will therefore be locked onto the pipeline. Having the clamp locked onto the pipeline prevents unintentional removal of the shroud from the pipeline.

A clamp, 14, having locking ears, 13, could also be placed on the second end of the shroud to lock the second end of the shroud onto a pipeline. An eye, 15, can be provided at the end of the shroud opposite to the hinged clamp for attachment of a lifting device (not shown).

Figure 2:
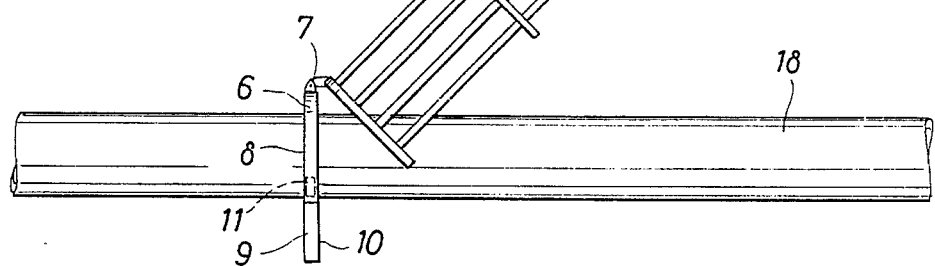
FIG. 2 is an isometric view of a preferred embodiment of the shroud of the present invention being placed on a pipeline.

Referring now to FIG. 2, another embodiment of the shroud of the present invention is shown with elements numbered as in FIG. 1. FIG. 2 shows the clamp, 6, latched onto a pipeline, 18, and being lowered onto the pipeline. A second shroud, 17, is shown attached to the first shroud by a hinge, 16. The hinged connection between the first and the second shroud permits the shrouds to be laid down onto the pipeline sequentially. The length of each individual shroud is limited by the stiffness of the rods. If a shroud that is too long is laid down onto the pipeline, the rods will buckle. With hinged segments, a very long segment of pipe can be covered with a shroud in one operation. A lifting connection, 15, is shown to enable a hook or other type of disconnectable attachment to a lifting cable.

The length of an individual shroud is preferably between about 20 and about 40 feet, with a length of about 20 feet preferred. The individual shroud segments can be hinged and laid down in a single operation, or laid onto the pipeline end-to-end in a plurality of operations. It is preferred that over half of an unsupported segment of pipeline be surrounded by the shroud of this invention.

A series of small scale current tank tests were performed in order to examine the effectiveness of a shroud of axial rods in decreasing the amplitude of vortex-induced vibrations. A test pipe was used having a 2-inch inside diameter, 73-inch length, with a 0.065-inch wall thickness. The test pipe was mounted vertically as a cantilever beam. The pipe size was selected such that the first mode cross-flow vibration lock-on was at a current speed between 5 and 6 ft/sec, this velocity being within the capability of the current tank. The pipe was fixed in position by an aluminum clamp which was mounted to a test frame. A Columbia model HEVP-14 Biaxial Accelerometer was installed inside the tip of the test pipe and used to measure accelerations. The orientations of the accelerometer axes were set to align with the flow direction and transverse to the flow direction. The analog signals from the accelerometer were amplified, digitized, and then stored in the hard disk drive of a personal computer. The sampling frequency was 128 Hz for all of the tests. The acceleration data was double-integrated to produce a displacement-time history. Finally, root-mean-square displacements were computed from the time history.

Small scale axial shrouds were fabricated for this study. Each device was 8-inches long and consisted of eight 3/16-inch aluminum rods which were welded to two concentric aluminum plates. The dimensions of the shroud are shown in FIG. 4. The shrouds were placed on the test pipe such that the angle between the normal of the plane of the rods and the flow currents (θ) were 0 degrees, 45 degrees and 90 degrees.

The first tests performed determined the natural frequencies of the bare test pipe and the test pipe with the shroud. This was achieved by releasing the test pipe from a prescribed initial displacement at the tip and monitoring the accelerometer. The natural frequency of the test pipe was measured to be 5.0 Hz. The natural frequency of the test pipe with the shroud was found to be 4.9 Hz. The measured natural frequency, 5.9 Hz, of the bare pipe was used to calculate the nondimensional reduced velocity ($V_1=V/f_n D$).

Tests were conducted to evaluate the vortex-induced vibration amplitude of the bare pipe as the current speed varied from 3 ft/sec to 6 ft/sec (corresponding to reduced velocity from 3.6 to 7.2) with increments of 0.5 ft/sec. The results obtained from the bare pipe tests were used to compare the effectiveness of the suppression at different current speeds and angles. Similar tests were repeated for the test pipe with the axial rod shroud covering the pipe and the current coming at angles 0 degrees, 45 degrees and 90 degrees. The preferred design configuration for this shroud is for the current to be normal to the planes in which the rods lie. The shrouded pipe with the flow approaching at angles of 45 degrees and 90 degrees to ensure that the suppression capacity of the devices is still sufficient if the devices rotate around the pipeline due to inappropriate installation or external forces in the field.

FIG. 3 is a plot of cross-flow root mean square displacement as a function of reduced velocity for both the bare pipe and the shrouded pipe. The shrouded pipe has shrouds mounted along the full pipe length with the flow coming at different angles. For the bare pipe result, the vibration amplitude first builds up to a peak value as the reduced velocity increases, and then it begins to decrease as the upper limit of the lock-on range is approached. This demonstrates lock-on behavior that is known to be a characteristic of vortex-induced vibration. The maximum root mean square vibration amplitude of the bare pipe was about 1.2D, where D is pipe diameter. The maximum root mean square vibration occurred at reduced velocity of 6.6. The shroud was most effective when θ equaled 90 degrees in which case the vibration amplitude remained less than 0.15D over the entire testing range. The shroud was equally effective at θ equal to 0 degrees and at θ equal to 90 degrees when reduced velocity was less than 5.4. However, for θ equal to 0 degrees, the amplitude increased to about 0.25D as the flow velocity increased. This still represents a significant improvement over bare pipe. At θ equal to 45 degrees, a higher vibration amplitude was measured than at 0 degrees or 90 degrees.

The embodiments described above are exemplary and reference is made to the following claims to determine the scope of the present invention.

We claim:

1. A shroud for installation on a subsea pipeline, the shroud comprising:

a) at least two parallel and essentially vertical sides the at least two essentially vertical sides capable of creating disturbances in a fluid flowing normal to the axis of the parallel sides;

b) a connecting member between the essentially vertical sides, attached to the essentially vertical sides, capable of supporting the shroud on the subsea pipeline, and the essentially vertical sides effective to reduce the amplitude of vortex induced vibrations of the pipeline created by horizonal water currents perpendicular to the axis of the pipeline, when the shroud is supported on the subsea pipelines;

c) a clamp hingably connected to an end of the shroud wherein the clamp is capable of latching onto the pipeline when the shroud is suspended vertically over the pipeline; and d) a hinged connection to a second shroud at a second end of the shroud.

2. The shroud of claim 1 wherein the essentially vertical sides comprise a plurality of cylinders each essentially parallel to the axis of the pipeline, and the ratio of the outside diameters of the cylinders to the outside diameters of the pipeline being between about 1/12th and about 1/8th.

3. The shroud of claim 2 wherein each essentially vertical side comprises at least four cylinders, the cylinders of the fluid disturbance creating member being in a common plane.

4. The shroud of claim 3 wherein the cylinders of the two essentially vertical sides are in parallel planes that are essentially vertical when the shroud is supported on an essentially horizontal pipeline.

5. The shroud of claim 4 wherein the planes are separated from a centerline of the pipeline by a distance of about 1.2 to about 1.4 times the outside diameter of the pipeline.

6. The shroud of claim 1 having a length of between about 10 and about 30 feet.

\* \* \* \* \*